S. N. THOMAS
Fruit-Gatherer and Drier.
No. 38,848.  Patented June 9, 1863.
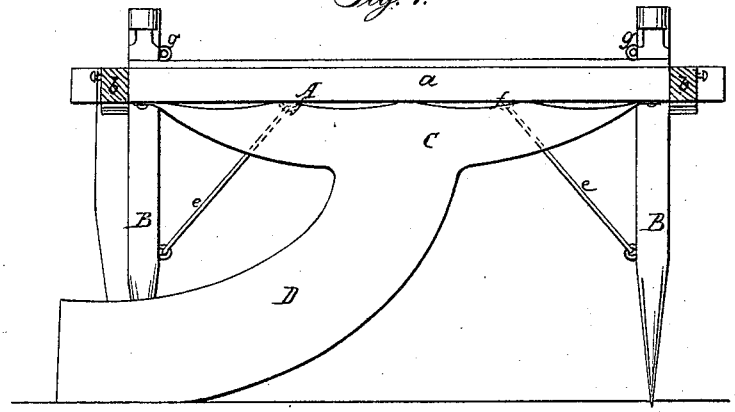
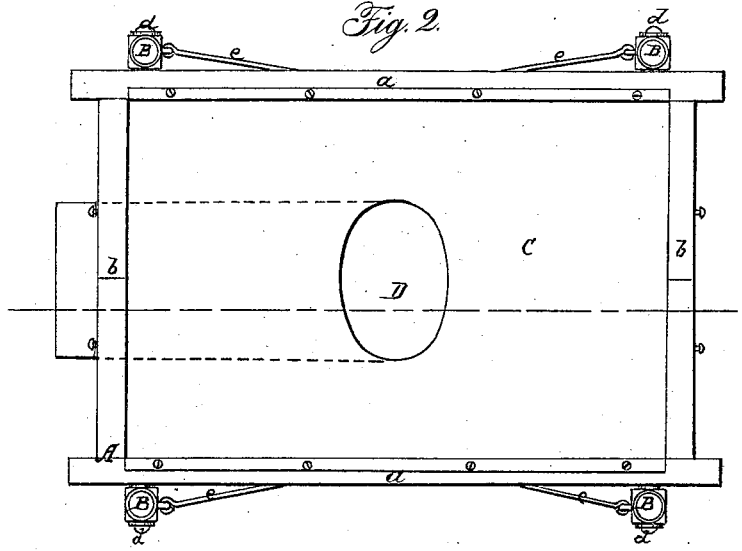
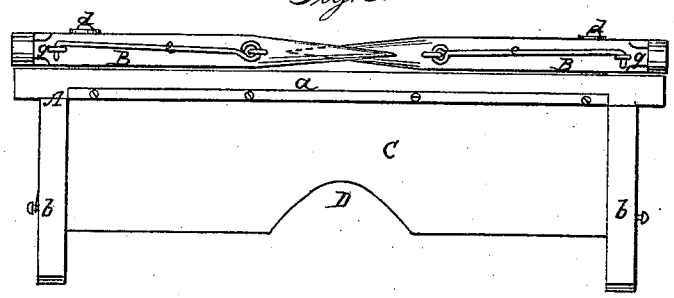
Witnesses:
Inventor:

UNITED STATES PATENT OFFICE.

SAMUEL N. THOMAS, OF AUBURN, NEW YORK.

IMPROVED FRUIT COLLECTING AND DRYING APPARATUS.

Specification forming part of Letters Patent No. 38,848, dated June 9, 1863; antedated April 11, 1863.

*To all whom it may concern:*

Be it known that I, SAMUEL N. THOMAS, of Auburn, in the county of Cayuga and State of New York, have invented a new and Improved Device for Receiving and Drying Fruit; and I do hereby declare that the following is a full, clear, and exact description of the same, reference being had to the accompanying drawings, forming a part of this specification, in which—

Figure 1 represents a longitudinal vertical section of my invention in working position as a fruit-receiver. Fig. 2 is a plan or top view of the same. Fig. 3 is a plan of the same when folded.

Similar letters of reference indicate corresponding parts in the several figures.

This invention consists in the employment or use of a frame provided with hinges, so that it folds up, and furnished with legs capable of being adjusted in a position at right angles to the rails constituting the sides of the frame when the implement is to be put in working order, or in a position parallel with said sides when the implement is not to be used, in combination with a canvas secured to the frame, and provided with a conductor leading down to the ground in such a manner that said canvas folds up and opens with the frame, and that the implement, when not used, can be stowed away in a comparatively small space, and that it can be easily carried from place to place and put up in working position whenever desired.

To enable those skilled in the art to make and use my invention, I will proceed to describe its construction and operation with reference to the drawings.

A represents a frame made of timber or any other suitable material, and composed of two side beam or rails, *a*, which are connected by the cross-bars *b*. These cross-bars are cut through in about the middle of their length, thereby separating the frame in two parts, which are connected by hinges *c*, so that the same can be opened to the position shown in Fig. 2 or folded up to the position shown in Fig. 3.

B are the legs, which are secured to the side rails, *a*, by means of pivots *d*, so that they can be turned freely, and that they can be brought in a position at right angles with said rails or parallel with them, as may be desired. Hooks *e*, which are hinged to the sides of said legs, and which catch in staples *f*, secured in the under sides of the rails *a*, serve to retain the legs when the same are brought in a position at right angles to the said rails. If the legs are turned up parallel to the side rails, said hooks are fastened in staples *g* near the upper ends of the legs.

To the frame A a piece of canvas, C, is firmly attached, so that the same folds and unfolds with the frame. This piece of canvas may be so arranged that it can be attached to the upper ends of the legs when the latter are in working position, and in this case the frame A is completely covered, and if the implement is now placed under a fruit-tree and the tree is shaken, the fruits are received by the canvas without being permitted to come in contact with the wood-work. From the center of the canvas C a conductor, D, leads to the ground. When the canvas is stretched on the frame it sags down in the middle, so that every fruit on reaching the canvas rolls to its center, and thence through the conductor to the ground.

When it is desired to use the implement for drying fruit small frames with tinned or galvanized wire-cloth stretched on them are placed on the frame A, and the fruit, being spread on said small frames, can now be exposed to the sun and dried with the greatest convenience.

When the implement is not used the legs B are turned up parallel with the side rails and the frame A is folded up, as shown in Fig. 3, and the whole device can now be conveniently stowed away in a small space. When thus folded up the implement can also be carried conveniently from place to place.

Having thus fully described my invention, what I claim as new, and desire to secure by Letters Patent, is—

The employment or use of the folding frame A, with adjustable legs B, in combination with the canvas C and conductor D, constructed and operating as and for the purposes shown and described.

SAMUEL N. THOMAS.

Witnesses:
 CHAS. W. HAVENS,
 HORACE T. COOK.